United States Patent [19]

Nagahori

[11] 4,347,792
[45] Sep. 7, 1982

[54] DRIVELESS VEHICLE WITH SPEED CONTROL CAM

[75] Inventor: Katsuhiro Nagahori, Chiba, Japan

[73] Assignee: SI Handling Systems, Inc., Easton, Pa.

[21] Appl. No.: 217,862

[22] Filed: Dec. 18, 1980

[30] Foreign Application Priority Data

Jan. 11, 1980 [JP]  Japan ............................ 55-1655[U]

[51] Int. Cl.³ ............................................ B61B 13/12
[52] U.S. Cl. ...................................... 104/166; 74/89; 104/249
[58] Field of Search ............... 104/88, 165, 166, 249, 104/250; 198/345, 472, 648; 105/241.2, 268; 74/89, 567

[56] References Cited

U.S. PATENT DOCUMENTS 3,972,293  8/1976  Watts ................................. 104/130
4,036,148  7/1977  Jones et al. ......................... 104/166

Primary Examiner—Randolph A. Reese
Attorney, Agent, or Firm—Seidel, Gonda, Goldhammer & Panitch

[57] ABSTRACT

A driverless vehicle has at least one drive wheel mounted on a base and oscillatable about the axis of its support between a drive position and an accumulation position. A cam is supported on the base by a horizontal parallelogram linkage with one leg of the linkage connected to the drive wheel support for moving the drive wheel support between said positions. A ground supported cam follower is provided for actuating the cam.

4 Claims, 16 Drawing Figures

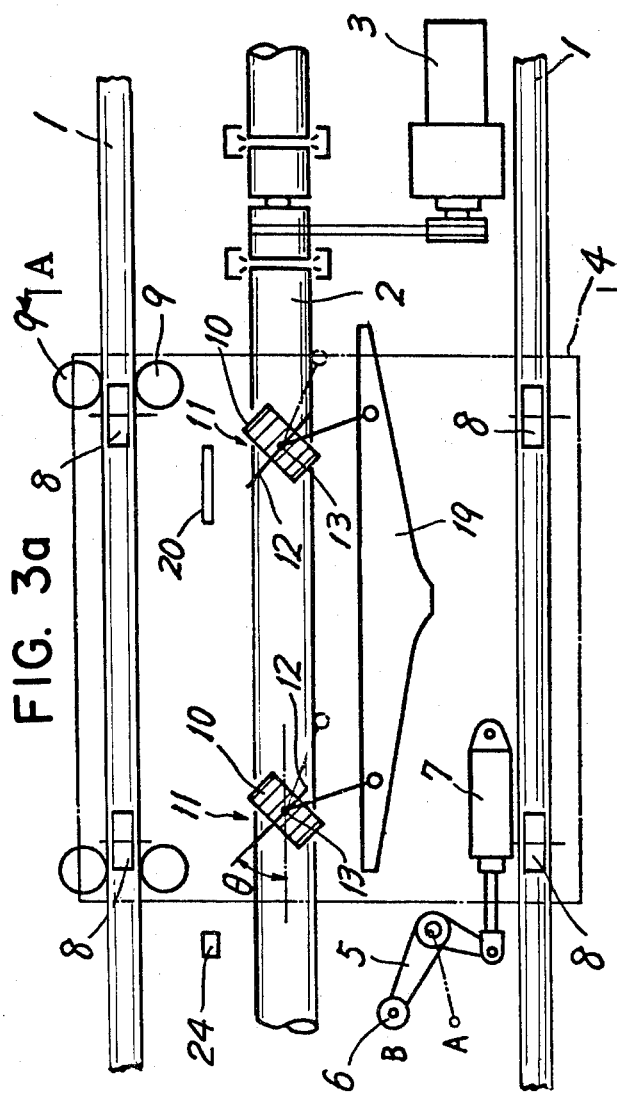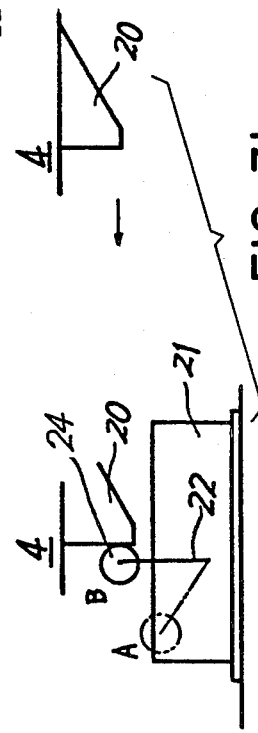

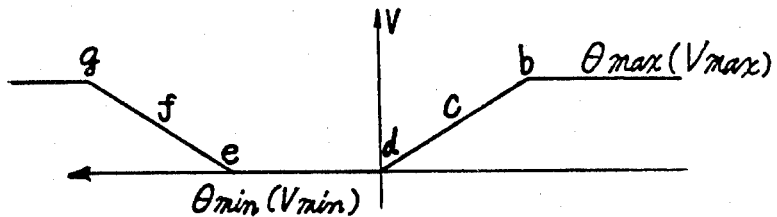
FIG. 7a
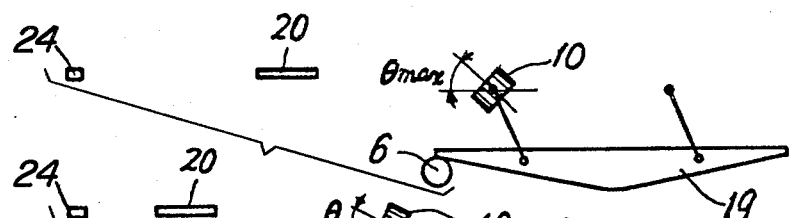
FIG. 7b
FIG. 7c
FIG. 7d
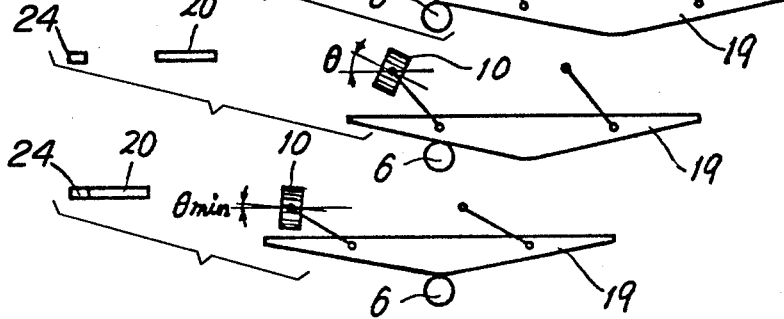
FIG. 7e
FIG. 7f
FIG. 7g
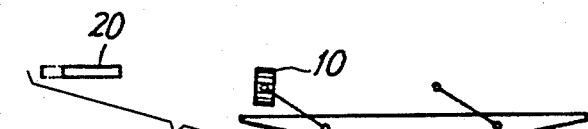
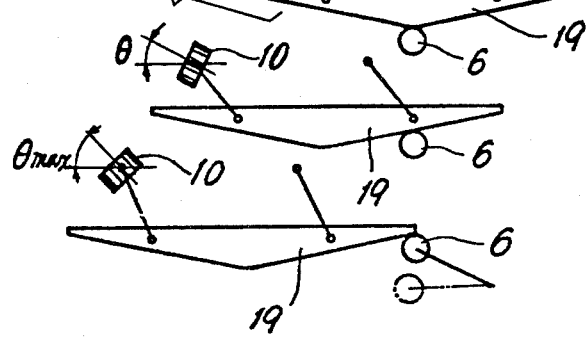

DRIVELESS VEHICLE WITH SPEED CONTROL CAM

BACKGROUND

In prior art systems of the type involved herein, it is conventional to provide a cam at various locations along the conveyor system where it is desired to cause the vehicles to accumulate. While a vehicle has accumulated or stopped, it may be loaded, unloaded, or work may be performed on a product supported by the vehicle. If the conveyor system is very large, there may be 100 positions along the system where it is desired to cause vehicles to stop. If there are 100 stations in the system, there must be 100 cams with associated motors or actuators. A typical motor actuator is a pneumatic cylinder.

The present invention is directed to a solution of the problem of how to minimize the number of cams and the costs involved.

SUMMARY OF THE INVENTION

The present invention is directed to a driverless vehicle and a conveyor system incorporating such vehicle. The vehicle includes a base mounted on support wheels. At least one drive wheel having a support is provided. The support is connected to the base and is oscillatable about its axis so as to provide the drive wheel with a drive position and an accumulation position.

A cam is supported on the base by a horizontally disposed parallelogram linkage. One leg of the linkage is connected to the support for moving the drive wheel between said positions. The cam has a generally longitudinally extending acceleration and deceleration surface positioned so that the surfaces may contact a cam follower which will cause the cam to move transversely of the base.

It is an object of the present invention to provide a novel driverless vehicle and system incorporating such vehicle.

It is another object of the present invention to eliminate cams at locations along a conveyor system where it is desired to cause a vehicle to stop, and to cause such vehicles to stop by way of a cam follower at such locations.

Other objects and advantages will appear hereinafter.

FIGS. 3a and 3b are diagrammatic illustrations of the present invention.

FIG. 4 is a sectional view taken along the line A—A in FIG. 3a.

FIGS. 7a through 7g are diagrammatic views for explaining operation of the present invention.

DETAILED DESCRIPTION—PRIOR ART

Figure 1:
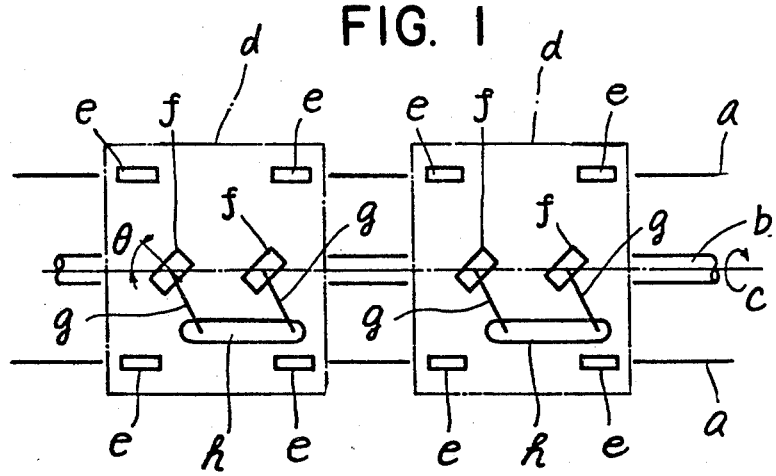
FIG. 1 is a diagrammatic plan view for explaining the general principles involved in systems of the type involved herein.

In FIG. 1, there is illustrated a pair of tracks (a) with a drive shaft (b) therebetween. The drive shaft (b) is driven by a motor not shown so as to rotate about is longitudinal axis as indicated by the arrow (c). A pair of driverless vehicles (d) are provided with support wheels (e). The support wheels (e) ride on the tracks (a). Each of the vehicles (d) is identical and hence only one such vehicle will be described in detail.

Each of the vehicles (d) has at least one drive wheel. For supporting heavier loads, a pair of drive wheels (f) may be provided. Each drive wheel (f) has a support which oscillates about an upright axis so as to move the drive wheels (f) from the drive position as shown in FIGS. 1 and 2 to a stop or accumulation position as indicated by the angle $\theta$.

The supports for the drive wheels (f) are provided with an arm (g) which define two links of a parallelogram. The ends of the arms (g) are interconnected by a connecting rod (h).

Figure 2:
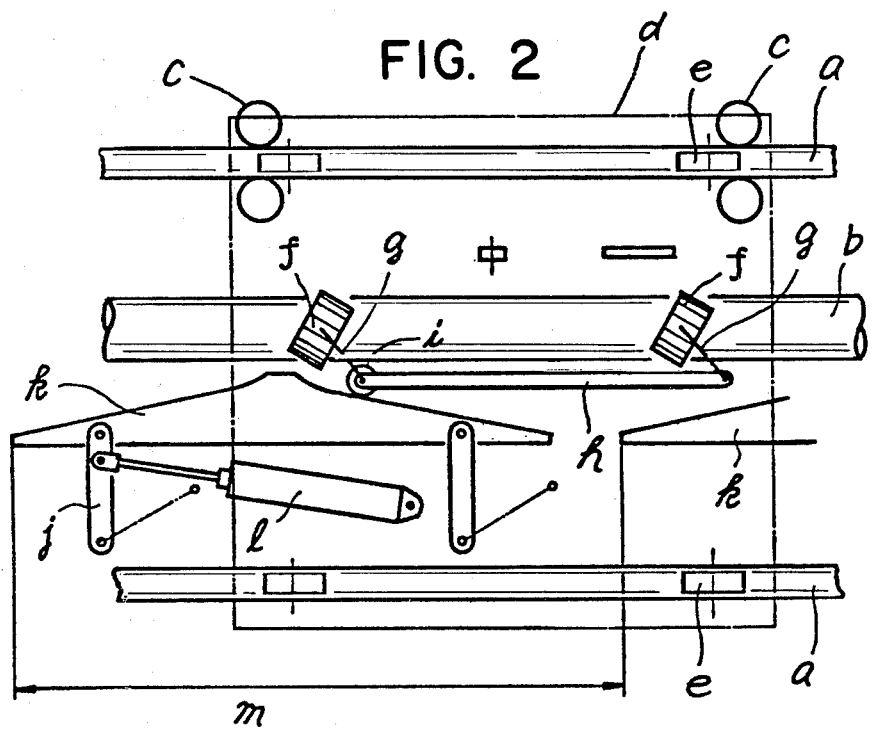
FIG. 2 is a diagrammatic plan view of a prior art system involving the principles set forth in connection with FIG. 1.
Figure 4:
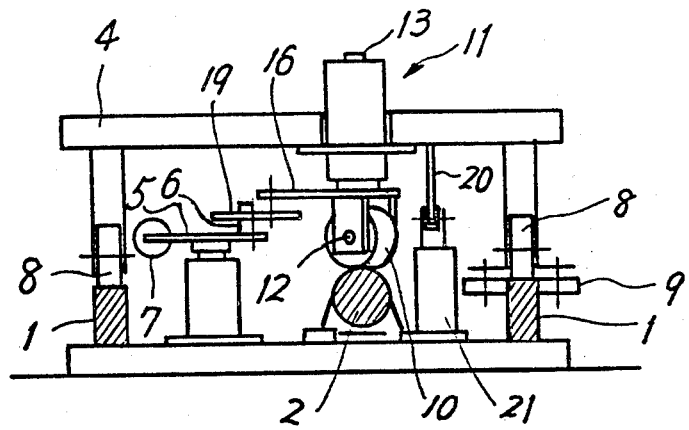

As shown more clearly in FIG. 2, the connecting rod (h) is provided with a cam follower (i). A cam (k) having an acceleration surface and a deceleration surface is supported by the conveyor system at a location where it is desired to cause the vehicle (d) to stop or accumulate. The cam (k) is supported by a parallelogram linkage (j) and coupled to an actuator motor such as cylinder (l). Thus, cylinder (l) may move the cam (k) between operative and inoperative positions. When using a cam (k) along the tracks (a), the minimum distance between stop positions is designated by the dimension (m). The dimension (m) exceeds the length of the vehicle (d) and exceeds the length of the cams (k).

DETAILED DESCRIPTION—PRESENT INVENTION

Referring to FIG. 3a, there is illustrated a diagrammatic plan view of a conveyor system involving a pair of parallel rails 1 with a drive shaft 2 therebetween. Drive shaft 2 is driven so as to rotate about its longitudinal axis by way of a motor 3. A driverless vehicle 4 has a base provided with support wheels 8. The support wheels 8 ride on the rails 1. The vehicle base is also provided with guide wheels along one side such as guide wheels 9 which cooperate with one of the rails 1.

Between the rails 1, there is provided a cam follower 6 supported at one end of a bell crank 5. Bell crank 5 is pivoted between an operative position designated B and an inoperative position designated A by a power cylinder 7.

The drive wheels 10 are in frictional contact with the drive shaft 2 and may pivot between a drive position as shown and an accumulation position. The angle between the drive position and the accumulation position is designated angle $\theta$. The wheels 10 rotate about a horizonally disposed axle 12.

Figure 5A:
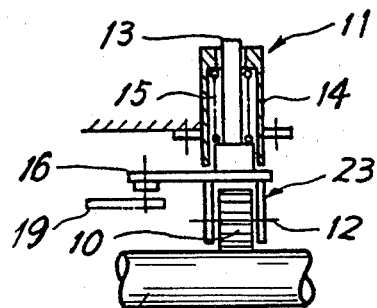
FIGS. 5a and 5b are detailed elevation views of the drive wheel.
Figure 5B:
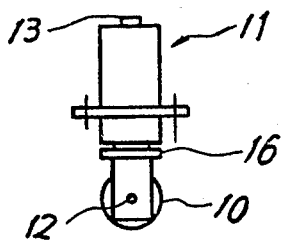
Figure 6A:
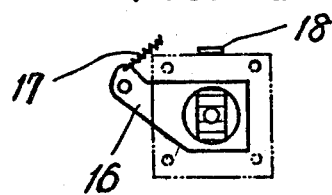
FIGS. 6a and 6b are detailed plan views of the drive wheel.
Figure 6B:
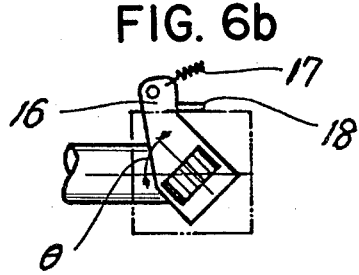

Referring to FIG. 5, the drive wheels 12 are provided with a support designated generally as 11. The support 11 includes a housing 14. Within housing 14, there is a oscillatable shaft 13 surrounded by a torsion spring 15. Spring 15 biases shaft 13 and the yoke 23 connected thereto to a drive position for the drive wheel 10 as shown in FIG. 3a. An arm 16 projects horizontally from and is fixedly secured to the yoke 23. Arm 16 is biased by spring 17 toward the limit stop 18 on the housing 14. See FIGS. 6a and 6b.

Cam 19 is elongated in the direction of the vehicle and has a dwell surface between an acceleration surface and a deceleration surface. The end portions of the cam 19 are connected to the arms 16 associated with the two drive wheels 10. As shown more clearly in FIG. 3, a parallelogram linkage is attained by the arms 16 and the fact that they are pivoted to the cam 19 at locations spaced apart by a distance which corresponds to the distance between the axis of the shafts 13 associated with the drive wheels 10.

Referring to FIGS. 3a and 3b, the base 4 is provided with a rigid limit stop 20. Limit stop 20 is adapted to engage a retractable limit stop 24 supported by an arm 22 and mounted within the housing 21. The inoperative position of the movable limit stop is designated A in FIG. 3b while the operative position is shown in solid lines.

The graph in FIG. 7a is correlated to the illustrations in FIGS. 7b–7g. In FIG. 7a, a vehicle is moving from right to left at maximum velocity and decelerates as illustrated in FIGS. 7b, 7c and 7d. The vehicle is in an accumulation position until it commences to accelerate in FIG. 7e.

While moving at maximum velocity, the angle $\theta$ is at a maximum as shown in FIG. 7b. When the cam follower 6 contacts the deceleration surface of the cam 19, it shifts the cam 19 to thereby decrease the angle $\theta$ to the minimum shown in FIG. 7d. The rotation of the drive shaft 2 imparts a small force in a forward direction as indicated by the angle $\theta$ min. However the vehicle does not move due to contact between the limit stops 20 and 24.

When limit stop 24 is moved to an inoperative position, the vehicle creeps forward slowly while the cam follower 6 traverses the dwell and thereafter the vehicle accelerates and the cam follower 6 traverses the acceleration surface. See FIGS. 7e and 7f. As soon as the cam follower 6 loses contact with the cam 19, the drive wheels are again in a position where angle $\theta$ is at a maximum and velocity is at a maximum.

While the present invention is preferably utilized with a pair of drive wheels, it will function in substantially the identical manner with only one drive wheel so long as the remaining structure such as elements 13-16 and 23 are retained. The minimum distance between stopping position is limited by the length of the vehicle.

The present invention may be embodied in other specific forms without departing from the spirit or essential attributes thereof and, accordingly, reference should be made to the appended claims, rather than to the foregoing specification, as indicating the scope of the invention.

I claim:

1. A driverless vehicle comprising a base mounted on support wheels, at least one drive wheel having a support and oscillatable therewith about the axis of its support between a drive position and an accumulation position, a cam supported on the base by a horizontal parallelogram linkage, one leg of which is connected to said support for moving said drive wheel support and said drive wheel between said positions, said cam having a generally longitudinally extending acceleration and deceleration surface positioned so that said surfaces may contact a cam follower and as a result of such contact move transversely of the base.

2. A vehicle in accordance with claim 1 wherein said cam has a shape so that its width in a transverse direction is gradually increased and then gradually decreased.

3. A vehicle in accordance with claim 1 including a pair of said drive wheels each pivotably connected to said cam, the length of said cam being greater than the distance between said drive wheels.

4. A conveyor system including a driverless vehicle in accordance with claim 1, a pair of tracks on which said support wheels are guided, a drive shaft between said tracks in contact with said drive wheel, a cam follower supported between said drive shaft and one of said tracks, means for moving said cam follower between operative and inoperative positions, said cam follower being in a position for contact with one of said surfaces on said cam when the cam follower is in its operative position.

* * * * *